(12) United States Patent
Chen et al.

(10) Patent No.: US 9,380,176 B2
(45) Date of Patent: Jun. 28, 2016

(54) VOICE BAND DATA MODE IN A UNIVERSAL FACSIMILE ENGINE

(75) Inventors: Ximing Chen, Ringoes, NJ (US);
Herbert B. Cohen, Allentown, PA (US);
James K. Flynn, Breinigsville, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 649 days.

(21) Appl. No.: 13/481,917

(22) Filed: May 28, 2012

(65) Prior Publication Data

US 2013/0314741 A1 Nov. 28, 2013

(51) Int. Cl.
*G06F 15/00* (2006.01)
*H04N 1/00* (2006.01)

(52) U.S. Cl.
CPC ...... *H04N 1/0022* (2013.01); *H04N 2201/0024* (2013.01)

(58) Field of Classification Search
USPC .......................................................... 370/352
See application file for complete search history.

(56) References Cited

U.S. PATENT DOCUMENTS

| | | | | |
|---|---|---|---|---|
| 5,802,150 | A * | 9/1998 | Beck et al. ................. | 379/93.06 |
| 6,038,037 | A | 3/2000 | Leung et al. | |
| 6,055,067 | A * | 4/2000 | Matsuda et al. ............. | 358/468 |
| 6,230,189 | B1 * | 5/2001 | Sato et al. ..................... | 709/206 |
| 6,396,848 | B1 * | 5/2002 | Ohta ............................. | 370/490 |
| 6,463,135 | B2 * | 10/2002 | Abrishami et al. ...... | 379/100.01 |
| 6,570,676 | B1 * | 5/2003 | Sebestyen ..................... | 358/425 |
| 6,957,380 | B2 * | 10/2005 | Lee et al. ..................... | 714/774 |
| 6,999,478 | B2 * | 2/2006 | D'Angelo ............... | H04L 12/14 370/352 |
| 7,330,283 | B2 * | 2/2008 | Lee et al. ..................... | 358/1.15 |
| 7,489,633 | B2 * | 2/2009 | Garakani et al. ............. | 370/231 |
| 7,697,171 | B2 * | 4/2010 | Tonegawa ..................... | 358/402 |
| 8,503,630 | B2 * | 8/2013 | Watts ........................ | 379/100.17 |
| 8,514,420 | B2 * | 8/2013 | Kaneko ......................... | 358/1.14 |
| 8,630,178 | B2 * | 1/2014 | Nakagawa .................... | 370/235 |
| 8,942,244 | B2 * | 1/2015 | Ulybin ......................... | 370/401 |
| 2002/0037107 | A1 * | 3/2002 | Trachtman ................... | 382/232 |
| 2002/0059481 | A1 * | 5/2002 | Nunally ............................ | 710/5 |
| 2004/0005909 | A1 | 1/2004 | Coy et al. | |
| 2004/0184110 | A1 | 9/2004 | Maei et al. | |
| 2005/0249196 | A1 * | 11/2005 | Ansari et al. .................. | 370/352 |
| 2006/0132846 | A1 | 6/2006 | Dicken et al. | |

(Continued)

FOREIGN PATENT DOCUMENTS

EP 1119183 A2 7/2001
EP 1744533 A2 1/2007

OTHER PUBLICATIONS

Comtech, OEM-MODEM-56C2/34C2/32C2/24C2 Design Manual, Feb. 18, 2005.*

*Primary Examiner* — Melvin Marcelo
*Assistant Examiner* — Peter Solinsky

(57) ABSTRACT

A facsimile apparatus includes a user interface operative to facilitate communications between the apparatus and at least one user application in operative communication with the apparatus, a network interface operative to facilitate communications between the apparatus and an analog communications network and an IP communications network. The apparatus further includes a controller connected to the user interface and network interface. The controller is operative in a first mode to communicate with the analog communications network using a first facsimile protocol and being operative in at least a second mode to communicate with the IP communications network using the first facsimile protocol and a voice band data protocol.

24 Claims, 6 Drawing Sheets

(56) References Cited

U.S. PATENT DOCUMENTS

| | | | |
|---|---|---|---|
| 2006/0227764 A1* | 10/2006 | Miriyala et al. | 370/352 |
| 2007/0206739 A1* | 9/2007 | Livengood et al. | 379/100.01 |
| 2007/0229910 A1* | 10/2007 | Ulybin | 358/405 |
| 2008/0002232 A1* | 1/2008 | Mori | H04N 1/00885 358/401 |
| 2008/0095145 A1* | 4/2008 | Ulybin | 370/352 |
| 2008/0117477 A1* | 5/2008 | Fujise | 358/468 |
| 2008/0218809 A1* | 9/2008 | Chen et al. | 358/407 |
| 2009/0135731 A1* | 5/2009 | Secades et al. | 370/252 |
| 2009/0141709 A1* | 6/2009 | Cho et al. | 370/352 |
| 2009/0190159 A1 | 7/2009 | Toscano et al. | |
| 2010/0008264 A1* | 1/2010 | Ellis et al. | 370/259 |
| 2010/0041375 A1* | 2/2010 | Osborn | 455/411 |
| 2010/0132000 A1* | 5/2010 | Straub | H04N 5/50 725/117 |
| 2010/0253962 A1* | 10/2010 | Higuchi et al. | 358/1.13 |
| 2010/0268552 A1* | 10/2010 | Schoenberg et al. | 705/3 |
| 2011/0032827 A1* | 2/2011 | Susan | 370/241 |
| 2011/0134914 A1* | 6/2011 | Wasiel et al. | 370/353 |
| 2012/0013937 A1* | 1/2012 | Ashmore | H04L 47/18 358/1.15 |
| 2012/0057192 A1* | 3/2012 | Chen et al. | 358/1.15 |
| 2012/0262761 A1* | 10/2012 | Ulybin | H04N 1/32789 358/407 |
| 2013/0003132 A1* | 1/2013 | Ashmore | H04N 1/32765 358/442 |
| 2013/0148797 A1* | 6/2013 | Toscano et al. | 379/100.08 |
| 2013/0271782 A1* | 10/2013 | Ashmore | H04N 1/33369 358/1.14 |

* cited by examiner

VOICE BAND DATA MODE IN A UNIVERSAL FACSIMILE ENGINE

BACKGROUND

Despite efforts to become a paperless society and regardless of the prevalence of email communications, facsimile (or fax) transmission of printed materials (e.g., text, photographs, or the like) remains vital, particularly for business users. One reason for the continued popularity of faxes is that, unlike email attachments or digital signatures, the signature on a fax document is legally binding. Moreover, fax documents retain the format of the original source document and are virtually uneditable.

A traditional analog fax generally involves the transmission of scanned-in printed material (text or images), usually to a telephone number associated with a printer or other output device via a public switched telephone network (PSTN), as specified, for example, in the International Telecommunication Union (ITU) T.30 standard (see, e.g., *ITU-T Recommendation T.30, Series T: Terminals for Telematic Services, Procedures for Document Facsimile Transmission in the General Switched Telephone Network*, September 2005, the disclosure of which is incorporated by reference herein in its entirety for all purposes). An original source document is scanned-in by a fax machine, which treats the contents as a single fixed graphic image, converting it to a bitmap. Once in this digital form, the information is transmitted as electrical signals through the telephone system. The receiving fax machine reconverts the coded image and prints a paper copy of the document.

As the transmission of voice over the internet, using voice over internet protocol (VoIP) technology, permeates private and public organizations, such organizations find it desirable to leverage the value and convenience of their single, distributed IP communications network. Since fax transmissions generally utilize the same facilities as voice communications, it is becoming increasingly popular to implement fax transmissions using facsimile over internet protocol (FoIP) as specified, for example, in the ITU T.38 standard (see, e.g., *ITU-T Recommendation T.38, Series T: Terminals for Telematic Services, Facsimile—Group 3 Protocols, Procedures for Real-time Group 3 Facsimile Communication Over IP Networks*, April 2007, the disclosure of which is incorporated by reference herein in its entirety for all purposes).

One known method of sending fax images and modem data over a packet network is by way of voice band data (VBD), as specified in ITU V.152 standard (see, e.g., *Recommendation ITU-T V.152, Series V: Data Communication Over The Telephone Network, Interworking with other networks, Procedures for supporting voice-band data over IP networks*, September 2007, the disclosure of which is incorporated by reference herein in its entirety for all purposes). VBD is widely used in media gateway systems and analog telephone adapters (ATAs) because it is simple and easy to implement, and it transmits fax and modem data the same way as it does for voice traffic. However, a major disadvantage of VBD in gateway and ATA systems is its inability to handle packet losses and burst jitters (e.g., variable delay) that are common in an IP network. For this reason, T.38 was adopted by ITU, and supported by many commercial gateway and ATA products. However, the T.38 standard does not compensate for transmission problems between gateways/ATAs and end devices, such as traditional facsimile machines. A traditional VBD session for fax transmission over IP networks needs gateways or ATAs to convert analog signals (from/to a traditional fax machine) to digital packets, as shown in a prior art system 100 in FIG. 1. FIG. 1 shows traditional fax machines 105-1 to 105-4 connected to IP network 130 by way of PSTNs 110-1, 110-2 and VBD-enabled gateways 115-1, 115-2 and by way of VBD-enabled ATAs 120-1, 120-2. Only with the help of VBD capable gateways and ATAs can the fax machines in FIG. 1 engage in VBD-based VoIP fax sessions.

SUMMARY

Conventionally, analog fax engines are used by analog fax machines to send and receive images over a PSTN connection, while T.38-based IP fax engines are used in IP-aware fax machines and FoIP media gateways. Embodiments of the invention advantageously enable fax machine vendors to use a single universal fax engine operative to transmit/receive fax data (e.g., representative of printed materials—text, images, or the like) using analog PSTN, T.38 based FoIP, and VBD based FoIP protocols. A simple AT command set is included, according to embodiments of the invention, for controlling the operation of the new universal fax engine.

In accordance with one embodiment of the invention, a facsimile apparatus includes a user interface operative to facilitate communications between the apparatus and at least one user application in operative communication with the apparatus, a network interface operative to facilitate communications between the apparatus and an analog communications network and an IP communications network. The apparatus further includes a controller connected to the user interface and network interface. The controller is operative in a first mode to communicate with the analog communications network using a first facsimile protocol and being operative in at least a second mode to communicate with the IP communications network using the first facsimile protocol and a voice band data protocol.

Embodiments of the invention will become apparent from the following detailed description, which is to be read in connection with the accompanying drawings.

BRIEF DESCRIPTION OF THE DRAWINGS

The following drawings are presented by way of example only and without limitation, wherein like reference numerals indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the invention will be described herein in the context of illustrative universal facsimile apparatus and methods adapted to be employed in both a public switch telephone network (PSTN) and an Internet Protocol (IP) network. It is to be appreciated, however, that the invention is not limited to the specific apparatus and methods illustratively shown and described herein. Rather, aspects of the invention are directed broadly to techniques for beneficially integrating features of two or more facsimile protocols. In this manner, aspects of the invention provide a single facsimile engine that can be beneficially used in a variety of applications using multiple protocols and/or data formats.

While illustrative embodiments of the invention will be described herein with reference to ITU-T T.30, T.38, and V.152 protocols, it is to be appreciated that the invention is not limited to use with these particular protocols. Rather, principles of the invention may be extended to essentially any facsimile communications protocol, both standard and non-standard. Moreover, it will become apparent to those skilled in the art given the teachings herein that numerous modifications can be made to the embodiments shown that are within the scope of the present invention. That is, no limitations with respect to the specific embodiments described herein are intended or should be inferred.

Figure 1:
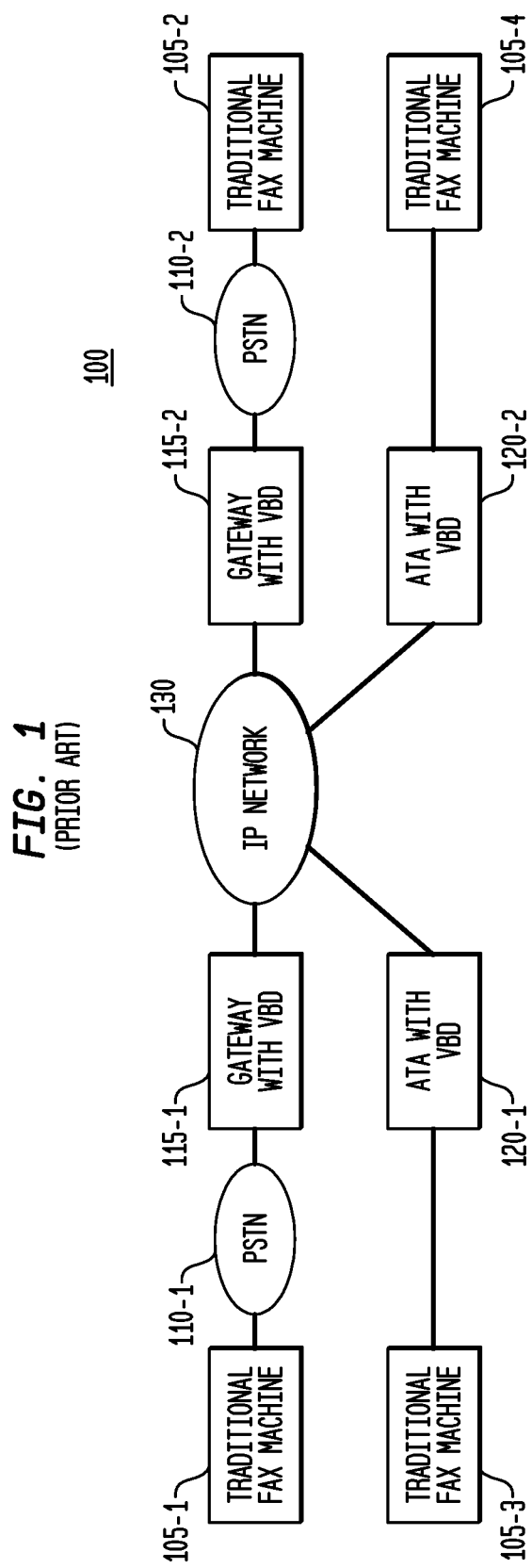
FIG. 1 is a block diagram depicting a prior art system for facsimile transmission between traditional facsimile devices over IP network with VBD enabled FoIP gateways/ATAs.

Embodiments of the present invention are directed towards apparatus and techniques that provide an alternative implementation for voice band data (VBD)-based VoIP facsimile (fax) sessions. In particular, an illustrative embodiment of a universal fax engine (UFE) is described that provides various modes of operation for a facsimile device, such as analog PSTN fax mode, T.38 based FoIP mode, and VBD based VoIP mode. In accordance with embodiments of the invention, devices incorporating the universal fax engine with VBD-based VoIP are capable of bypassing VBD-enabled gateways/ATA by directly connecting to an IP network during a fax session. A VBD protocol engine and interface (as specified in ITU V.152), which is conventionally part of local gateways/ATAs (as shown in FIG. 1), is integrated into the universal fax engine according to embodiments of the invention. Integrating VBD-based VoIP into the universal fax engine eliminates the need for using local gateways/ATAs in VBD-based VoIP fax sessions. In accordance with embodiments of the invention, a facsimile device with the universal fax engine and VBD-based VoIP capability directly connects to an IP network without local ATAs or gateways. One advantage of eliminating gateways and ATAs from a fax session is that unwanted sides effects typically introduced by gateways and ATAs are eliminated, such as delay, digital-to-analog conversion, homologation of telephony tones and rings, among other disadvantages.

Figure 2:
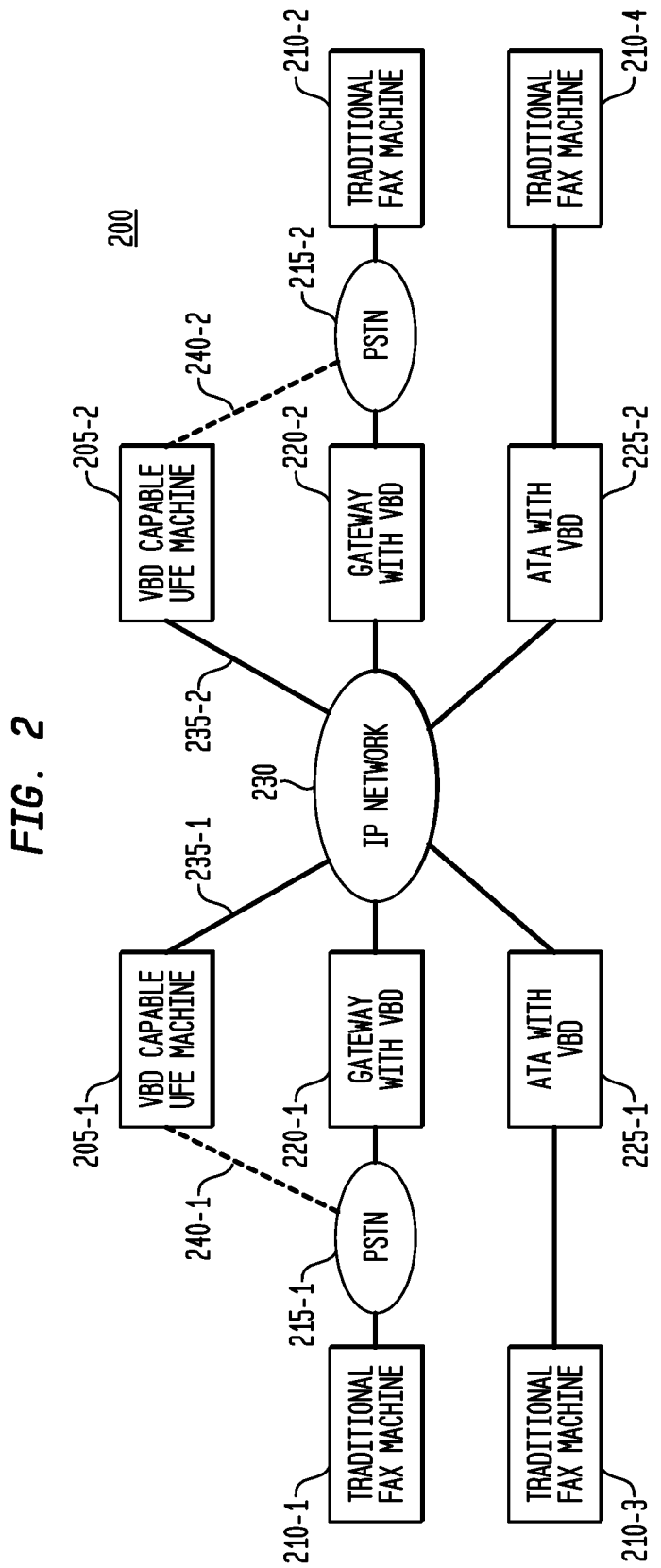
FIG. 2 is a block diagram depicting an illustrative network of PSTNs, VBD enabled gateways/ATAs, traditional fax machines, and fax machines with VDB capabilities and universal fax engines.

FIG. 2 is a block diagram depicting at least a portion of an exemplary system 200, according to an embodiment of the invention. As shown in FIG. 2, the system 200 includes VBD-UFE fax machines 205-1 and 205-2, each including a universal fax engine with VBD-based VoIP mode capability, in accordance with an embodiment of the invention. Also shown in FIG. 2 are traditional facsimile machines 210-1 to 210-4, PSTNs 215-1 to 215-2, FoIP gateways 220-1 to 220-2 with VBD-based VoIP mode support, FoIP ATAs 225-1 to 225-2 with VBD mode support, and an IP network 230. As apparent from the figure and in accordance with embodiments of the invention, VBD-UFE fax machines 205-1 and 205-2 send and receive faxes in VBD mode over IP Network 230 without the assistance of local gateways and ATAs. Specifically, during a fax session VBD-UFE fax machine 205-1 bypasses PSTN 215-1 and gateway 220-1, making an IP connection directly to IP network 230 by way of a communications link 235-1. In the present embodiment, communications links 235-1, 235-2 are Ethernet (RJ45) communications links, but can be a different communications link, such as, but not limited to, a Wi-Fi communications link. Alternatively, as shown in the figure, VBD-UFE fax machines 205-1 and 205-2 can send and receive faxes in analog PSTN fax mode directly to PSTN 215-1 and 215-2, respectively. This is achieved in part because the universal fax engines in fax machines 205-1 and 205-2 also include analog PSTN fax capabilities. For example, VBD-UFE fax machine 205-1 enabled with PSTN mode capabilities in the universal fax engine makes a PSTN connection by way of communications link 240-1. Communications links 240-1 and 240-2 can be, for example, an RJ11 jacket connection. In accordance with embodiments of the invention, a user of a VBD-based VoIP mode universal fax engine enhanced facsimile device, such as VBD-UFE fax machine 205-1, can choose to transmit a fax over either a traditional telephone network, an IP packet network, or can set an order of preferred networks (PSTN or IP) and fax machine 205-1 will check the existing connections and send the fax accordingly. The universal fax engine in, for example, VBD-UFE fax machines 205-1, 205-2, also includes the capability to operate in T.38-based VoIP mode when connecting to IP network 230 by way of communications link 235-1, 235-2.

Figure 3:
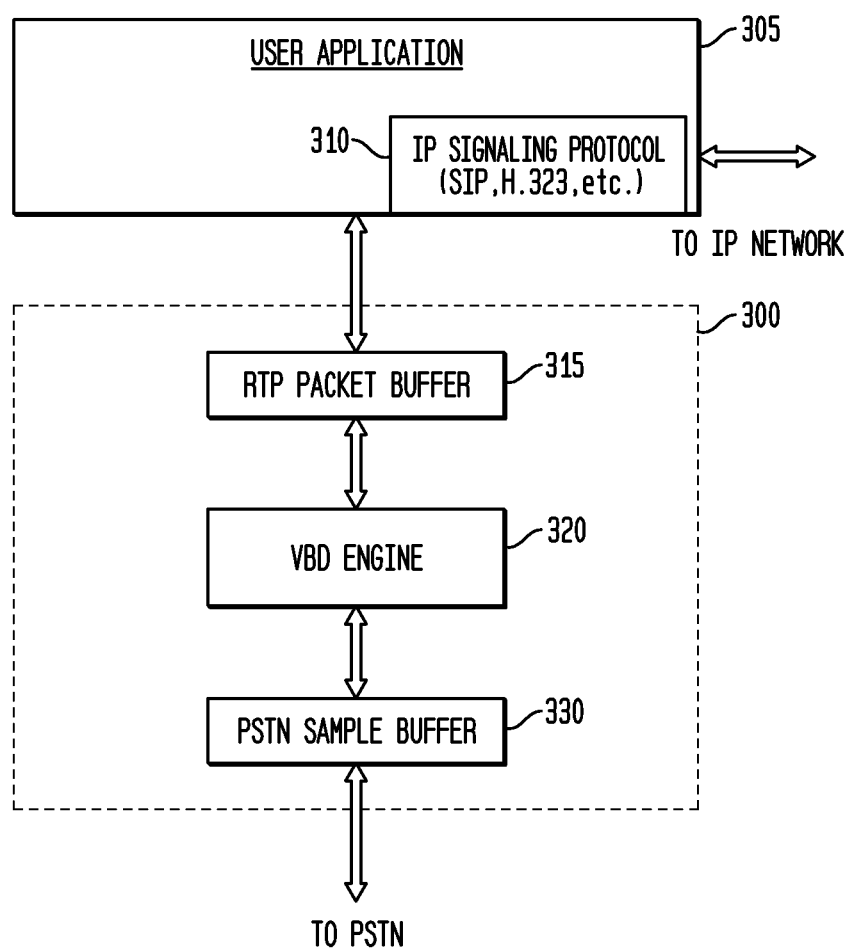
FIG. 3 is a block diagram depicting a traditional VBD based FoIP gateway/ATA.

FIG. 3 is a block diagram of a prior art FoIP gateway or ATA, for example, consistent with gateway 220-1 or ATA 225-1 shown in FIG. 2, operable in VBD mode for a facsimile session. As shown in FIG. 3, gateway 300 is operative to interface a PSTN to an IP network and generally shows a signal path for the conversion of PSTN signals and conversion of IP network packets via a VBD engine 320 (protocol engine), an RTP (Real-Time Transport Protocol) packet buffer 315 and a PSTN sample buffer 330, as specified in ITU V.152. In the present exemplary case, gateway 300 is operative to interface between a traditional PSTN (e.g., PSTN 215-1), using, for example, a T.30 protocol, and IP network 230 via one or more user applications 305, using, for example, a T.38 protocol. User application 305 may employ an IP signaling protocol 310, such as, for example, SIP or H.323, which is used for call setup and capability exchange between gateways or ATAs.

RTP packet buffer 315 receives data from user application 305 in the form of data packets from the IP network. RTP packet buffer 315 processes (e.g., reformats) the data packets for use by VBD engine 320. RTP packet buffer 315 provides an interface between user application 305 and the IP network and VBD engine 320. Additionally, traditional gateway 300 includes VBD engine 320 coupled to RTP packet buffer 315 and PSTN sample buffer 330. During operation, VBD engine 320 receives RTP packets and converts them into PCM (pulse-code modulation) samples. PSTN sample buffer 330 receives the PCM samples from VBD engine 320 and processes (e.g., reformats) them for transmission to the PSTN, such as PSTN 215-1 shown in FIG. 2. Likewise, PSTN sample buffer 330 receives PCM samples from the PSTN and processes (e.g., reformats) the data for use by VBD engine 320. In this manner, PSTN sample buffer 330 is operative to provide an interface between gateway 300 and a PSTN.

A major problem of traditional fax transmissions over packet network in VBD mode is that transmission signals are prone to various packet network impairments (e.g., packet loss, jitter, delay, etc.). These impairments are typically correctible in other types of end-to-end packet transmissions, such as, for example, between server—client web browsing. However, with traditional transmissions over a packet network in VBD mode, even if such impairments were corrected in the IP network, the transmission signals eventually pass through PSTNs and gateways/ATAs where protocol translation/mapping for interconnecting networks with different network protocol technologies can introduce signal errors in addition to analog transmission signal errors occurring along PSTN signal paths before the transmission signals ultimately reach the end devices.

In particular, transmission signals passing between end devices, such as traditional fax machines 210-1, 210-2, do not receive any real-time information on packet network impairments because such information cannot pass beyond gateways 220-1, 220-2 or PSTNs 215-1, 215-2. Thus, an end device such as a traditional fax machine is limited to treating signal degradation of signal quality in the same way it treats signal degradations that occur in the analog telephone network, leading to poor performance of VBD in facsimile and data transmissions, especially for high speed facsimile sessions, such as those set by V.34 standard. The same is true for traditional fax machines 210-2, 210-4, where real-time information on packet network impairments cannot reach fax machines 210-2, 210-4 because the transmission signals pass through ATAs 225-1, 225-2. In accordance with embodiments of the invention, the aforementioned problems and others are addressed in part by bypassing PSTNs and gateways/ATAs during fax sessions.

In accordance with embodiments of the invention, integrating a VBD-based VoIP protocol with an analog PSTN fax protocol into a single device provides for the availability and accessing of RTP packets and the processing of both PCM samples and RTP packets together. This greatly improves the performance of facsimile sessions over the packet network at least in part because by connecting directly to an IP network, real-time information on packet network impairments are available for processing on the device while avoiding any further signal degradation introduced along typical analog communications links Generally, RTP provides end-to-end transport of real-time data traffic on an IP network by including, in the message, timing information necessary for reconstruction at the far end. In this manner, information from RTP packets are used directly by VBD-UFE machines 205-1, 205-2 for better handling of packet loss, burst jitter and other impairments in the IP network, which is discussed in more detail below.

Figure 4:
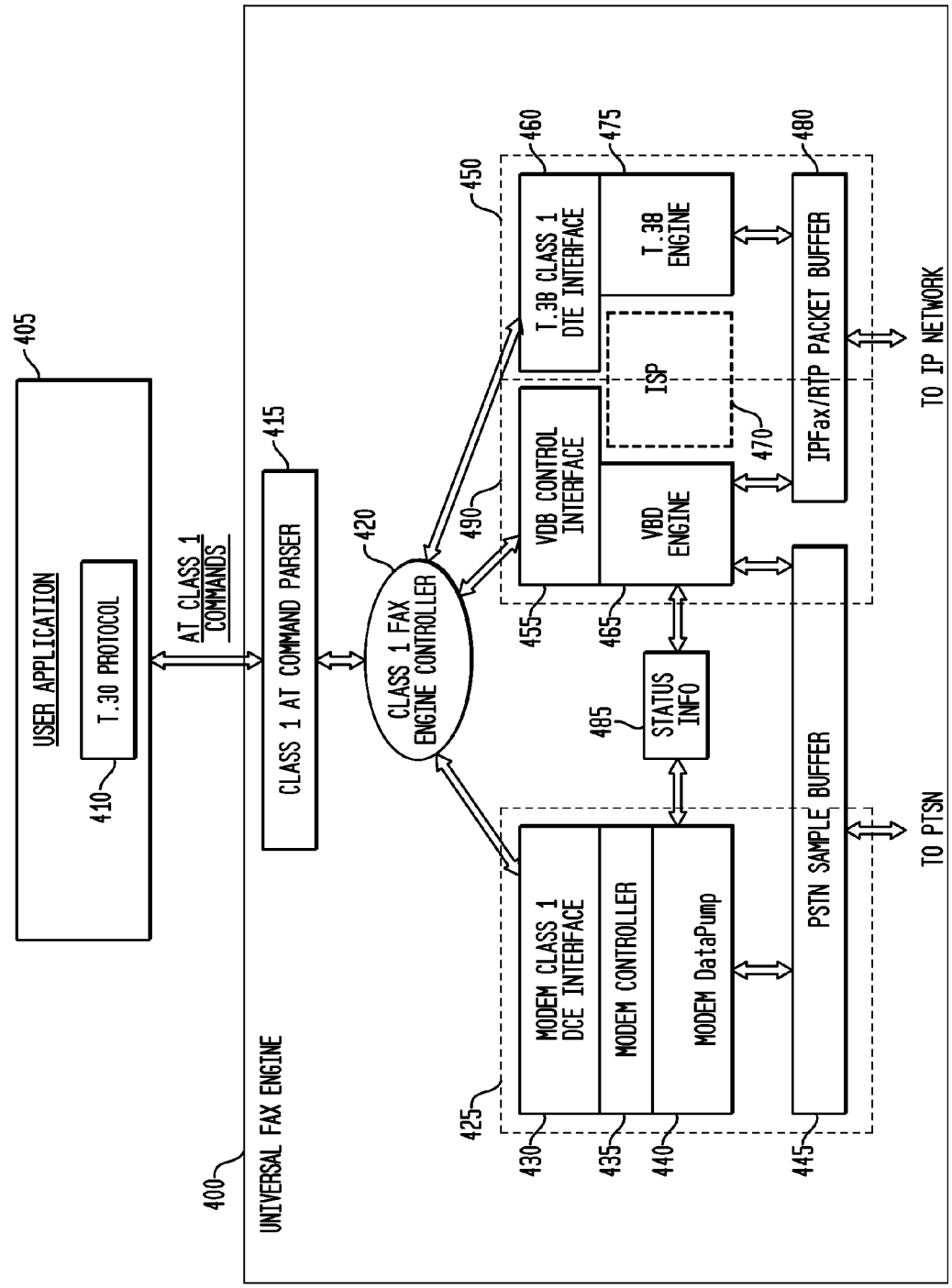
FIG. 4 is a block diagram depicting an exemplary universal fax engine, according to an embodiment of the present invention.

FIG. 4 is a block diagram depicting at least a portion of a universal fax engine 400, according to an embodiment of the present invention. The universal fax engine 400 supports an analog PSTN fax mode, T.38 based FoIP mode, and a VBD-based FoIP mode using a common T.30 (ITU fax protocol) module and an AT command interface. As mentioned above, universal fax engine 400 can be a core part of a system that supports traditional analog fax and ITU T.38-based fax over IP network. It should be realized that using a common T.30 module for all fax modes greatly reduces the scale of system tests needed for a facsimile product.

With reference to FIG. 4, for a class 1 AT command interface (e.g., ITU-T T.31), universal fax engine 400 comprises an AT command parser 415, or alternative interface. Command parser 415 preferably utilizes the same AT command interface and AT command set as used in an analog fax engine. In this manner, the difference between operation as an analog fax versus operation as an IP fax is essentially transparent to the user. A user application 405, or an alternative user interface, which may implement a T.30 protocol 410 (e.g., software application or hardware circuitry), is preferably in operative communication with the universal fax engine 400. Although shown as two separate functional blocks, the user interface may incorporate components such as AT command parser 415.

The T.30 protocol 410 is preferably operative to control fax frames, image data, etc., under control of the user application 405. An advantage of this arrangement is that the user can control their own existing T.30 stack through the same standard AT command interface to control an analog fax, IP-based (e.g., T.38) fax, and a VBD IP-based (e.g. V.152) fax. More particularly, the same user application as employed with an analog fax engine, including an AT command interface with a well-defined set of AT commands, for example, ITU-T T.31 (Class 1) and ITU-T T.32 (Class 2) standards, or an alternative control application, may be used to interface with universal fax engine 400. This enables end users to support both a PSTN fax session and an IP network fax session without any significant changes to their fax application software.

Universal fax engine 400 further includes a class 1 fax engine controller 420 coupled between the class 1 AT command parser 415 and analog stack 425, IP-aware stack 450 and VBD-IP-aware stack 490. Fax engine controller 420 is operative to control the mode of operation and/or state of the universal fax engine 400. Specifically, fax engine controller 420 is coupled to AT command parser 415, modem class 1 DCE interface 430, T.38 class 1 DTE interface 460, and VBD control interface 455. There are at least three modes of operation for universal fax engine 400; for example, a first mode, which is an analog fax modem mode (analog PSTN fax), a second mode, which is an IP-aware fax mode, and a third mode, which is a VBD-based FoIP mode for direct connection to an IP network.

For communication with a PSTN (e.g., analog PSTN fax), universal fax engine 400 comprises an analog stack 425 including a modem class 1 data communication equipment (DCE) interface 430, a modem controller 435 operatively coupled to the DCE interface, and a modem data pump 440 coupled to modem controller 435. Modem data pump 440 is operatively coupled to a PSTN sample buffer 445. PSTN sample buffer 445 serves as an interface to an analog PSTN and is operative to send and receive pulse-code modulation (PCM) samples to and from the PSTN. This mode of operation and implementation is discussed in detail in an application by at least a subset of the inventors herein entitled "Universal Facsimile Engine," filed on Sep. 8, 2010 and assigned Ser. No. 12/877,965, the disclosure of which is incorporated by reference herein in its entirety for all purposes.

For communication with an IP network (T.38 based FoIP), universal fax engine 400 comprises an IP-aware stack 450 including a shared IP signaling protocol (ISP) module 470 which is operatively coupled to a T.38 protocol class 1 data terminal equipment (DTE) interface (i.e., T.38 class 1 DTE interface 460) and operatively coupled to T.38 engine 475 (i.e., protocol engine). ISP module 470 is also operatively coupled to VBD control interface 455 and VBD engine 465, which are discussed below. The T.38 engine 475 is also operatively coupled to an IPfax/RTP packet buffer 480, which serves a dual purpose. When universal fax engine 400 is in T.38-based VoIP mode, IPfax/RTP packet buffer 480, which serves as an interface to an IP network, is operative to send and receive T.38 IP fax packets over the IP network, for example UDPTL packets. Alternatively, when in a VBD-based VoIP mode, IPfax/RTP packet buffer 480 is operative to send and receive RTP packets over the IP network, which is discussed in further detail below.

The IP fax interface can be software-based; that is, the physical IP interface (e.g., IP stacks) does not have to reside on the same chip as the T.38 stack (e.g., comprising T.38 class 1 DTE interface 420, T.38 protocol engine 422, and ISP module 424). Universal fax engine 400 can send/receive IP fax packets to/from either user application 405 or other hardware/software where an actual IP connection exists. This mode of operation and implementation is discussed in detail in the application Ser. No. 12/877,965 referenced above, and therefore further discussion will not be provided herein.

For communication with an IP network in VBD-based VoIP, universal fax engine 400 connects directly to an IP network without gateways/ATAs. Universal fax engine 400 comprises an IP-aware stack 490 including the V.152 protocol VBD control interface 455 operatively coupled to VBD engine 465 (i.e., protocol engine) and operatively coupled to IP signaling protocol (ISP) module 470 which is shared with IP-aware stack 450. VBD engine 465 is operatively coupled to PSTN sample buffer 445 and to IPfax/RTP packet buffer 480.

When universal fax 400 connects directly to an IP network in VBD-based VoIP, IPfax/RTP packet buffer 480, which serves as a direct interface to the IP network, is operative to send and receive RTP IP fax packets over the IP network, while serving as a jitter buffer for RTP packets. The RTP interface can be software-based; that is, the physical IP interface (e.g., IP stacks) does not have to reside on the same chip as the V.152 stack (e.g., comprising VBD control interface 455, VBD engine 465, and ISP module 470). The universal fax engine 400 can send/receive RTP packets to/from either user application 405 or other hardware/software where an actual IP connection exists.

PSTN sample buffer 445 also serves a dual purpose, depending on whether universal fax engine 400 connects directly to an IP network or connects to traditional PSTNs. Generally, PSTN sample buffer 445 is operative to send and receive PCM samples to and from the PSTN when universal fax engine 400 is operating in analog PSTN fax mode. In contrast, when universal fax engine 400 is connected directly to an IP network in VBD mode, PSTN sample buffer 445 serves as an interface between VBD engine 465 and modem data pump 440.

As mentioned earlier, a major problem of fax transmission over packet network in VBD mode is that it is prone to various packet network impairments (packet loss, jitter, delay, etc.) because the end devices (fax machines) do not have any real-time information on packet network impairments resulting in poor performance of VBD in fax and data transmissions. The RTP protocol provides a facility for acquiring and utilizing real-time information for jitter compensation and detection of out of sequence arrival in data, which is common during transmissions on an IP network. Information provided by this protocol includes timestamps (for synchronization), sequence numbers (for packet loss and reordering detection) and the payload format which indicates the encoded format of the data. Integrating RTP packet buffer 480 into universal fax engine 400 allows for this information to be utilized and processed locally by universal fax engine 400 in the end device. In particular, a status information module 485 is operatively coupled to VDB engine 465 and modem data pump 440 so that information from RTP packets (VBD packets) can be directly used by modem data pump 440, greatly improving the performance of facsimile transmissions over the packet network. An illustrative mode of operation of VBD based FoIP in universal fax engine 400 is described in further detail below in conjunction with FIG. 5.

In the exemplary embodiment shown in FIG. 4, universal fax engine 400 is operative to provide fax communications using three different protocols, namely, traditional Group 3 (using modem data pump 440) for faxing over an analog PSTN, T.38 protocols for faxing over an IP network (using T.38 engine 4675), and VBD (V.152)-based faxing directly over an IP network (using VBD engine 465) without gateways/ATAs. It is to be appreciated, however, that embodiments of the invention are not limited to any specific number of different protocols supported by the universal fax engine 400. For example, according to other embodiments, the universal fax engine may comprise one or more additional protocol stacks for relaying data traffic in other formats across analog and/or IP networks (e.g., ITU-T V.150.1 protocol for relaying modem traffic across IP networks—modem over IP (MoIP), as specified in *ITU-T Recommendation V.150.1, Series V: Data Communication Over the Telephone Network, Interworking with Other Networks, Modem-over-IP networks: Procedures for the End-to-end Connection of V-series DCEs*, January 2003, the disclosure of which is incorporate by reference herein in its entirety for all purposes.)

Figure 5:
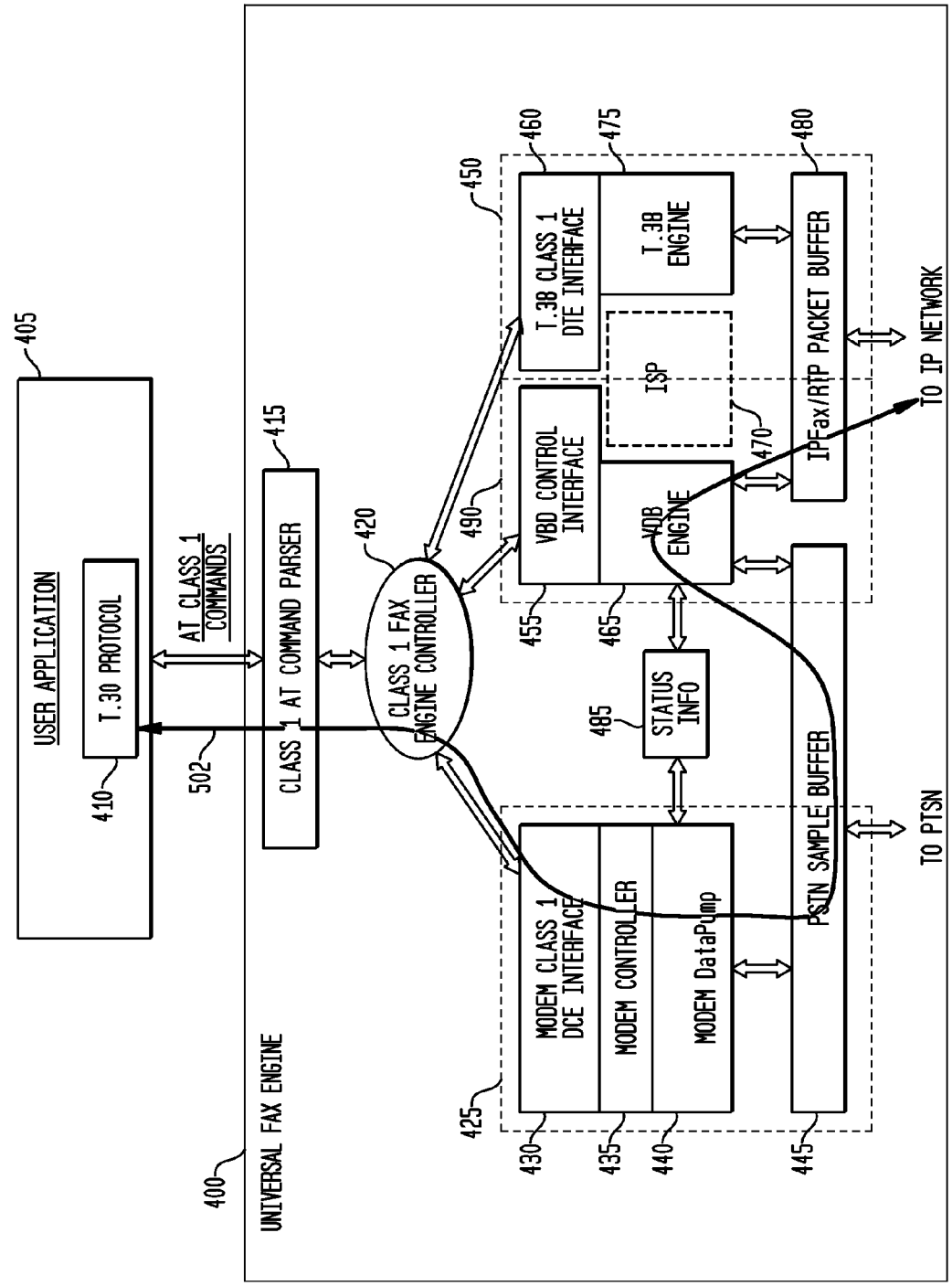
FIG. 5 is a block diagram depicting the exemplary universal fax engine shown in FIG. 4 used in a VBD mode implementation for direct connection to an IP network, according to an embodiment of the present invention.

FIG. 5 is a block diagram depicting the exemplary universal fax engine 400 shown in FIG. 4 used in a VBD-based VoIP implementation, according to an embodiment of the present invention. In this exemplary embodiment, universal fax engine 400 is operative in a traditional analog fax modem/machine application, in which a data flow path 502 from/to user application 405 (e.g., employing a T.30 protocol 410), through AT command parser 415, through fax engine controller 420, through analog stack 425 including PSTN sample buffer 445, VBD engine 465, IPfax/RTP packet buffer 480, and to/from an IP network. Specifically, when universal fax engine 400 receives a fax in direct connection with the IP network, RTP packets associated with the fax are received in IPfax/RTP packet buffer 480. The IPfax/RTP packet buffer 480 is preferably operative to receive RTP data packets from the IP network via user application 405 which are preferably processed (e.g., reformatted) by the buffer for use by VBD engine 465. In this manner, IPfax/RTP packet buffer 480 provides data and timing information to VBD engine 465. The RTP data packets are processed by VBD engine 465 into PCM samples and stored in PSTN sample buffer 445. Fax modem data pump 440 receives real-time information on packet network impairments from status information module 485, receives and demodulates the PSTN signal (PCM samples) and sends the data stream to the host or user application 405 by way of modem controller 435, modem class 1 DCE interface 430, class 1 fax engine controller 420, and class 1 AT command parser 415.

As apparent from FIGS. 4 and 5 and in accordance with embodiments of the invention, because modem data pump 440 and VBD engine 465 are located and operate on the same device (i.e., universal fax engine), as opposed to a VBD engine running on a gateway/ATA as shown in FIG. 3, status information exchanged between the two blocks makes a VBD-based FoIP session much more reliable. In particular, status information block 485 is operatively coupled to modem data pump 440 and VBD engine 465 so that VBD engine 465 can share network information received in the RTP packets. Further, modem data pump 440 can operate not only based on data from status information block 485, but also the PCM samples from the PSTN sample buffer 445. Specifically, information from VBD packets are used directly by facsimile modem data pumps in VBD-capable UFE machines 205-1, 205-2 for better handling of packet loss, burst jitter and other impairments in the IP network.

In the reverse direction of data flow path 502, when universal fax engine 400 sends a fax in direct connection with the IP network, data from host or user application 405 sends the data stream to modem data pump 440 by way of class 1 AT command parser 415, class 1 fax engine controller 420, modem class 1 DCE interface 430, and modem controller 435. Modem controller 435 formats the data and provides the data to modem data pump 440 where the data is modulated into PCM samples. Modem data pump 440 sends the PCM to the VBD engine 465 via PSTN sample buffer 445. VBD engine 465 encodes and packetizes the PCM samples into RTP packet and sends the packets to the IP network by way of IPFax/RTP packet buffer 480.

Modes of operation of the universal fax engine 400, or at least a subset thereof, are preferably controlled by way of an AT command interface, or alternative control/interface methodology. By way of illustration only and without loss of generality, embodiments of the invention provide an AT command set, AT+fclass=nclass, defining a new mode class, IP fax class. This class is assigned a number (e.g., 9) which is not currently used by any other mode of the traditional analog modem command set. For example, operational modes of the universal fax engine may be defined as follows:

AT+fclass=9.1, IP-aware fax T.38 mode with class 1 (T.31) interface;
AT+fclass=9.2, IP-aware fax T.38 mode with class 2 (T.32) interface;
AT+fclass=9.3, FoIP gateway/ATA mode;
AT+fclass=9.4, IP-aware data modem mode;
AT+fclass=9.5, MoIP gateway/ATA mode;
AT+fclass=9.6, IP-aware fax VBD mode with class 1 (T.31) interface;
AT+fclass=9.7, IP-aware fax VBD mode with class 2 (T.31) interface.

The above exemplary command definitions are presented by way of illustration only. It is to be understood, however, that embodiments of the invention are not limited to the specific command definitions shown and described herein. Rather, other and/or additional command definitions may be utilized, as will become apparent to those skilled in the art given the teachings herein.

Figure 6:
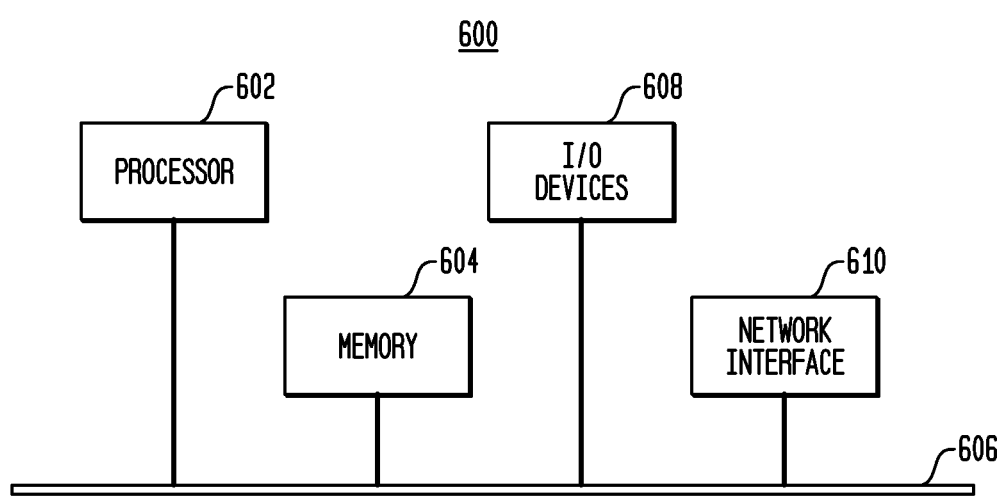
FIG. 6 is a block diagram depicting an exemplary data processing system, according to an aspect of the present invention.

Methodologies according to embodiments of the invention may be particularly well-suited for implementation in an electronic device or alternative system, such as, for example, a network router/switch device. By way of illustration only, FIG. 6 is a block diagram depicting an exemplary data processing system 600, formed in accordance with an aspect of the invention. System 600 may represent, for example, a fax device (e.g., fax modem, fax machine, etc.) adapted for communicating with a PC and/or another fax device using, for example, a G3 and/or a T.38 communications protocol. System 600 may include a processor 602, memory 604 coupled to the processor, as well as input/output (I/O) circuitry 608 operative to interface with the processor. The processor 602, memory 604, and I/O circuitry 608 can be interconnected, for example, via a bus 606, or alternative connection means, as part of data processing system 600. Suitable interconnections, for example via the bus, can also be provided to a network interface 610, such as a network interface card (NIC), which can be provided to interface with a computer, IP network, a PSTN, and to a media interface, such as a diskette or CD-ROM drive, which can be provided to interface with media. The processor 602 may be configured to perform at least a portion of methodologies according to embodiments of the invention described herein above.

It is to be appreciated that the term "processor" as used herein is intended to include any processing device, such as, for example, one that includes a central processing unit (CPU) and/or other processing circuitry (e.g., network processor, DSP, microprocessor, etc.). Additionally, it is to be understood that the term "processor" may refer to more than one processing device, and that various elements associated with a processing device may be shared by other processing devices. The term "memory" as used herein is intended to include memory and other non-transitory computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, one or more output devices (e.g., printer, monitor, etc.) for presenting the results associated with the processor, and/or interface circuitry for operatively coupling the input or output device(s) to the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 602. In any case, it is to be appreciated that at least a portion of the components shown in FIG. 4 may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

At least a portion of the techniques of the present invention may be implemented in one or more integrated circuits. In forming integrated circuits, die are typically fabricated in a repeated pattern on a surface of a semiconductor wafer. Each of the die includes a memory described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

An IC in accordance with embodiments of the present invention can be employed in any application and/or electronic system which is adapted for providing fax communications (e.g., fax modem/machine). Suitable systems for implementing embodiments of the invention may include, but are not limited to, personal computers, portable communications devices (e.g., cell phones), fax devices, etc. Systems incorporating such integrated circuits are considered part of this invention. Given the teachings of embodiments of the invention provided herein, one of ordinary skill in the art will be able to contemplate other implementations and applications of the techniques according to embodiments of the invention.

The illustrations of embodiments of the invention described herein are intended to provide a general understanding of the architecture of various embodiments of the invention, and they are not intended to serve as a complete description of all the elements and features of apparatus and systems that might make use of the architectures and circuits according to embodiments of the invention described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the inventive subject matter are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A facsimile apparatus, comprising:
a user interface operative to facilitate communications between the apparatus and at least one user application in operative communication with the apparatus;
a universal fax engine and a network interface operative to facilitate communications between the apparatus and an analog communications network and an Internet Protocol (IP) communications network, the universal fax engine comprising:
a command parsing interface to receive a first command set from the user interface to enable a first mode and to receive a second command set from the user interface to enable at least a second mode; and
a controller connected to the user interface and network interface, the controller being operative in the first mode in response to a command from the first command set to communicate directly with a voice band data-enabled gateway or an analog telephone adapter (ATA) of the analog communications network using a first facsimile protocol and being operative in at least the second mode in response to a command from the second command set to use said network interface to bypass the voice band data-enabled gateway or the analog telephone adapter (ATA) of the analog communications network to communicate directly with the IP communications network using the first facsimile protocol, using a voice band data protocol, and using a real-time transport protocol (RTP) packet buffer which enables sending and receiving one or more RTP packets over the IP communications network.

2. The apparatus of claim 1, wherein the network interface comprises:
an analog stack including a modem data communication equipment (DCE) interface utilizing the first facsimile protocol, a modem controller coupled to the DCE interface, a modem data pump coupled to the modem controller and coupled to a public switched telephone network (PSTN) sample buffer.

3. The apparatus of claim 2, wherein the network interface further comprises:
a voice band data (VBD)-IP-aware stack including a VBD control interface, a VBD protocol engine coupled to the VBD control interface, an IP signaling protocol (ISP) module coupled to the VBD protocol engine and to the VBD control interface, and the VBD protocol engine coupled to the PSTN sample buffer and to the real-time transport protocol (RTP) packet buffer.

4. The apparatus of claim 1, wherein the network interface comprises an analog stack including a modem data pump and a voice band data (VDB)-IP-aware stack including a VDB protocol engine.

5. The apparatus of claim 4, wherein the network interface comprises a status information module coupled to the modem data pump and to the VBD protocol engine to share real-time information on packet network impairments.

6. The apparatus of claim 5, wherein the real-time information on packet network impairments is from the one or more RTP packets.

7. The apparatus of claim 6, wherein the RTP packet buffer processes the one or more RTP packets for use by the VBD protocol engine, wherein the VBD protocol engine processes the one or more RTP packets into PCM samples which are stored by a PSTN sample buffer, and wherein the modem data pump receives the real-time information from the PSTN sample buffer for better handling of packet loss and burst jitter during a VBD based VoIP fax session.

8. The apparatus of claim 2, wherein the network interface comprises an IP-aware stack including a data terminal equipment (DTE) interface utilizing a second facsimile protocol, a protocol engine coupled to the DTE interface, the IP signaling protocol (ISP) module coupled to the protocol engine and to the data terminal equipment (DTE) interface, and the protocol engine coupled to a facsimile packet buffer.

9. The apparatus of claim 8, wherein the second facsimile protocol is an ITU-T T.38 protocol.

10. The apparatus of claim 8, wherein the second facsimile protocol is an Internet Protocol (IP)-aware protocol.

11. The apparatus of claim 8, wherein the first facsimile protocol is a Group 3 (G3) protocol and the second facsimile protocol is an ITU-T T.38 protocol.

12. The apparatus of claim 1, wherein the command parsing interface is further configured to receive a third command set to enable at least a third mode, wherein the first mode is an analog facsimile modem mode, the second mode is a voice band data Voice over Internet Protocol (VoIP) mode, and the third mode is a Fax over Internet Protocol (FoIP) mode, and wherein the RTP packet buffer communicates the one or more RTP packets when the second mode is enabled and the RTP packet buffer is further configured to communicate one or more facsimile packets over the IP communications network when the third mode is enabled.

13. The apparatus of claim 12, wherein the voice band data VoIP is an ITU-T V.152 protocol and the FOIP is an ITU-T T.38 protocol.

14. The apparatus of claim 1, wherein the user interface is in communication with the command parsing interface, the command parsing interface operative to at least one of: 1) receive one or more command sets from the at least one user application and convert said one or more command sets into one or more control signals utilized by the controller, and 2) receive one or more control signals from the network interface and convert said one or more control signals into one or more command sets utilized by the user application, and wherein the user interface is further configured to establish an order of preferred networks such that the apparatus will check existing connections and communicate facsimile data according to the established order and availability.

15. The apparatus of claim 1, wherein the user interface is operative to receive at least one user command, one or more modes of operation of the controller being controlled as a function of the at least one user command, and the at least one user command is a command from at least one of the first command set or the second command set.

16. The apparatus of claim 15, wherein the at least one user command is a command from the second command set and comprises an AT command that is distinct from a command found in a standard analog AT command set.

17. The apparatus of claim 15, wherein the at least one user command is a command from the second command set and comprises an AT command which defines an IP-aware facsimile class unused for analog facsimile transmissions.

18. An integrated circuit comprising at least one facsimile apparatus, the at least one facsimile apparatus comprising:
    a user interface operative to facilitate communications between the apparatus and at least one user application in operative communication with the apparatus;
    a universal fax engine circuit and a network interface operative to facilitate communications between the apparatus and an analog communications network and an IP communications network, the universal fax engine circuit comprising:
        a command parsing circuit to receive a first command set from the user interface to enable a first mode and to receive a second command set from the user interface to enable a second mode; and
        a controller circuit connected to the user interface and network interface, the controller circuit being operative in the first mode to communicate directly with a voice band data-enabled gateway or an analog telephone adapter (ATA) of the analog communications network using a first facsimile protocol and being operative in at least the second mode in response to the second command set to use said network interface to bypass the voice band data-enabled gateway or the analog telephone adapter (ATA) of the analog communications network to communicate directly with the IP communications network using the first facsimile protocol, aid using a voice band data protocol, and using a real-time transport protocol (RTP) packet buffer configured to enable communicating RTP packets through the IP communications network.

19. A method for facilitating facsimile communications using a facsimile protocol and a voice band date protocol, the method comprising steps of:
    facilitating communications between a facsimile device and at least one user application in operative communication with the facsimile device with a user interface;
    facilitating communications between the facsimile device and an analog communications network and an IP communications network with a universal fax engine and a network interface;
    parsing a first command set received at the universal fax engine from the user interface to enable a first mode of operation or parsing a second command set received at the universal fax engine from the user interface to enable at least a second mode of operation;
    communicating in the first mode of operation using a first facsimile protocol, said communicating in the first mode of operation is 1) in response to a command from the first command set, and 2) with a voice band data-enabled gateway or an analog telephone adapter (ATA) of the analog communications network; and
    communicating in at least the second mode of operation using the first facsimile protocol and a voice band data protocol, said communicating in the at least the second mode of operation is 1) in response to a command from the second command set enabling direct communications with the IP communications network, 2) without the voice band data-enabled gateway or the analog telephone adapter of the analog communications network, and 3) with a real-time transport protocol (RTP) packet buffer as an interface to the IP communications network to enable sending and receiving RTP packets.

20. The method of claim 19, further comprising processing status information from the RTP packets in the second mode of operation to reduce packet network impairments.

21. The method of claim 20, further comprising processing RTP data into PCM samples.

22. The method of claim 21, further comprising processing status information with PCM data to reduce packet network impairments.

23. An electronic system, comprising:
    a first facsimile device of a plurality of facsimile devices, said first facsimile device being adapted for communicating with at least a second facsimile device of the plurality of facsimile devices using a communication protocol, wherein at least the first facsimile device comprises:
    a processor;
    input/output (I/O) circuitry;
    a memory, wherein the memory, I/O circuitry, and the processor are interconnected to:
    facilitate communications between the first facsimile device and at least one user application in operative communications with the first facsimile device using a user interface;
    facilitate communications between the first facsimile device and an analog communications network and an IP communications network using a network interface and a universal fax engine, wherein the network interface comprises at least a public switch telephone network (PSTN) sample buffer and a real-time transport protocol (RTP) packet buffer;
    parse a first command set received at the universal fax engine from the user interface to enable a first mode of operation or parse a second command set received at the universal fax engine from the user interface to enable at least a second mode of operation;

communicate directly in the first mode of operation in response to a command from the first command set with a voice band data-enabled gateway or an analog telephone adapter (ATA) of the analog communications network using a first facsimile protocol; and communicate in at least the second mode to bypass the voice band data-enabled gateway or the analog telephone adapter (ATA) of the analog communications network to communicate directly with the IP communications network using the first facsimile protocol, a voice band data protocol, and the real-time transport protocol (RTP) packet buffer, wherein the PSTN sample buffer is configured to send and receive first pulse-code modulation (PCM) samples when the first facsimile device communicates in the first mode of operation, and the PSTN sample buffer is configured to store second PCM samples for a modem data pump when the first facsimile device communicates in at least the second mode of operation, the second PCM samples derived from RTP packets that are processed by a voice band data (VBD) engine.

24. An article of manufacture comprising a computer program product, the computer program product in turn comprising a non-transitory tangible computer readable recordable storage medium, storing in a non-transitory manner computer readable program code, the computer program product comprising:

computer usable program code configured to provide a first interface operative to facilitate communications between a facsimile device and at least one user application in operative communication with the facsimile device;

computer usable program code configured to provide a second interface operative to facilitate communications between the facsimile device and an analog communications network and an IP communications network;

computer usable program code configured to parse a first command set to enable a first mode of operation and to parse a second command set to enable at least a second mode of operation; and computer usable program code configured to receive a command of the parsed first command set to communicate directly with a voice band data-enabled gateway or an analog telephone adapter (ATA) of the analog communications network using a first facsimile protocol in the first mode of operation and further configured to receive a command of the parsed second command set to communicate in at least the second mode of operation to bypass the voice band data-enabled gateway or the analog telephone adapter (ATA) of the analog communications network and communicate directly with the IP communications network using the first facsimile protocol, using a voice band data protocol, and using a real-time transport protocol (RTP) packet buffer as an interface to the IP communications network to respectively send and receive RTP packets to and from the IP communications network.

* * * * *